Patented Sept. 23, 1947

2,427,791

UNITED STATES PATENT OFFICE 2,427,791

HYDROGENATION OF HALOGENATED HYDROCARBONS

Vladimir N. Ipatieff and Louis Schmerling, Riverside, Ill., assignors to Universal Oil Products Company, Chicago, Ill., a corporation of Delaware No Drawing. Application June 11, 1943, Serial No. 490,484

10 Claims. (Cl. 260—666)

This invention relates to the catalytic hydrogenation of halogenated saturated hydrocarbons in the presence of an alcohol, and more particularly to the hydrogenation of haloalkanes to produce therefrom aliphatic hydrocarbons.

An object of this invention is the treatment of a haloalkane and hydrogen in the presence of a hydrogenating catalyst and of an alcohol of relatively low molecular weight under conditions of temperature and pressure sufficient to convert a substantial proportion of said haloalkane into a paraffinic hydrocarbon.

Another object of this invention is the treatment of a halocycloparaffin and hydrogen in the presence of a hydrogenating catalyst and of an alcohol containing less than 4 carbon atoms per molecule at a temperature sufficient to convert a substantial proportion of said halocycloparaffin into a cycloparaffin.

In one specific embodiment the present invention comprises a process for treating a monohaloalkane and hydrogen in the presence of a hydrogenating catalyst and an aliphatic alcohol containing less than 4 carbon atoms per molecule under conditions of temperature and pressure sufficient to convert a substantial proportion of said monohaloalkane into aliphatic hydrocarbons and particularly into paraffins.

In a further embodiment the present invention comprises a process for reacting a polyhaloalkane and hydrogen in the presence of a hydrogenating catalyst and of an aliphatic alcohol containing less than 4 carbon atoms per molecule under conditions of temperature and pressure sufficient to convert a substantial proportion of said polyhaloalkane into an aliphatic hydrocarbon.

By the usual hydrogenation methods it is difficult to hydrogenate a halogenated saturated hydrocarbon with molecular hydrogen in the presence of a hydrogenating catalyst such as one of those generally used in the catalytic hydrogenation of unsaturated hydrocarbons. This difficulty is due mainly to the fact that the hydrogen halide produced in the early stages of the hydrogenation reacts with the catalyst to lower its hydrogenating activity. That is, a hydrogen halide acts as a poison to a hydrogenating catalyst with the result that a relatively small yield of hydrocarbons results from the hydrogenation of alkyl halides or of other halogenated saturated hydrocarbons in the presence of an ordinary hydrogenating catalyst. The halogenated saturated hydrocarbons referred to herein comprise the haloparaffins and halocycloparaffins.

The process of this invention avoids the difficulty due to catalyst poisoning by carrying out the hydrogenation of a halogenated saturated hydrocarbon in the presence of an alcohol of relatively low molecular weight which reacts with any liberated hydrogen halide to form an alkyl halide. Thus, in the presence of methanol, ethanol, or a propyl alcohol, a halogenated hydrocarbon may be hydrogenated to form the corresponding hydrocarbon and an alkyl halide such as methyl, ethyl, or a propyl halide without producing hydrogen halide in sufficient concentration to harm appreciably the hydrogenating catalyst. Although the number of alcohols usable in the present process is relatively large, it is preferable to employ primary alcohols of relatively low molecular weights since the halides formed therefrom are quite stable under hydrogenating conditions.

The halogenated hydrocarbons which may be treated according to the process of this invention may be obtained from various sources and comprise both monohalogenated and polyhalogenated hydrocarbons and particularly monohaloalkanes and dihaloalkanes. Monohaloalkanes with highly branched chain structures, and convertible by the present process into highly branched paraffinic hydrocarbons, are obtainable for example by reaction of an alkyl halide such as tertiary butyl chloride or tertiary butyl bromide with an olefin in the presence of a metal halide catalyst as described in co-pending Schmerling application Serial Number 438,841, filed April 13, 1942. Dihaloalkanes which may also be employed as charging stock in the present process are also obtainable by condensation of an alkyl halide with a halo-olefin, particularly a chloro- or bromoolefin as set forth in co-pending Schmerling application, Serial Number 465,097, filed November 9, 1942.

The catalyst may be substantially any of those usually employed in the hydrogenation of unsaturated hydrocarbons, but certain types of catalysts are more effective than others for promoting the hydrogenation of halogenated hydrocarbons. Suitable catalysts for the present process comprise the metals of the iron group including nickel, cobalt, and iron, and their oxides, either used as such or supported by carriers as diatomaceous earth, alumina, and the like. Other suitable catalysts may be formed by subjecting to reduction a composite of copper oxide, aluminum oxide and/or zinc oxide. Platinum and palladium may also be utilized in some cases, but preferably supported by carriers such as alumina, silica, diatomaceous earth, etc.

A nickel-containing catalyst which we have used in the hydrogenation treatment of halogenated hydrocarbons contains approximately 66% by weight of total nickel, 30% of diatomaceous earth, and 4% of oxygen, the latter apparently combined with the nickel as nickel oxide. This catalyst is made by suspending diatomaceous earth in a dilute aqueous solution of a nickel salt such as nickel sulfate and then adding gradually thereto an excess of a hot saturated solution of sodium carbonate. In carrying out this catalyst preparation, a mixture of a nickel sulfate solution and diatomaceous earth is agitated vigorously while the sodium carbonate solution is added thereto to produce a precipitate which is then removed from the solution by filtration and later washed, dried, and reduced with hydrogen. Other nickel catalysts may also be prepared from different proportions of a nickel salt and a carrier.

The general steps outlined above for the preparation of a nickel catalyst may also be followed for producing a cobalt catalyst with relatively high activity for promoting the hydrogenation of alkyl halides to paraffins and of other halogenated hydrocarbons to the corresponding hydrocarbons.

Another catalytic material may be formed by subjecting to reduction a composite comprising essentially copper oxide and at least one member selected from the group consisting of aluminum oxide and zinc oxide. As an example, a so-called copper-alumina catalyst may be prepared by the general procedure of coprecipitating basic copper carbonate and aluminum hydroxide. The precipitation may be made either at room temperature or at a higher temperature, and the precipitating agent employed may comprise ammonium carbonate, ammonia, or in some cases a carbonate or hydroxide of sodium or potassium. The precipitated material is filtered, washed with water to remove soluble salts, dried, and reduced with hydrogen or with a gas mixture containing hydrogen. In some cases the dried precipitated materials are formed into granules or pellets, the latter generally being produced by a pelleting machine. A copper-alumina catalyst may also be prepared by other methods. Thus, coprecipitation of copper carbonate and alumina may be carried out at room temperature followed by heating at about 80° to about 90° C.; or one component may be precipitated first, the other solution added to the reaction mixture, and the second component then precipitated on the first precipitated material. The resulting precipitated mixture is then dried, and if desired it is formed into particles. The precipitated mixture or particles produced therefrom may then be reduced as hereinabove set forth.

In carrying out the process of this invention a hydrogenating catalyst may be utilized as a filler in suitable reactors through which the charged halogenated hydrocarbon, alcohol, and hydrogen are passed under hydrogenating conditions of temperature and pressure. The temperature employed in hydrogenating a halogenated hydrocarbon is dependent upon the nature of the charging stock, the ratio of hydrogen to charging stock, the composition and activity of the catalyst, etc. From the examples hereinafter set forth, it will be noted that a temperature above 200° C. was required under the operating conditions used when treating a monochloroalkane while a considerably lower temperature was utilizable for the hydrogenation of a dichloro compound.

The reaction products formed in the presence of either a fixed catalyst or of powdered catalyst are removed from the catalytic material and fractionated to separate desired products from unconverted charging stock. The unconverted charging stock is recycled to further contact with the mixture of halogenated hydrocarbon, alcohol, and hydrogen being charged to the process.

Although continuous type of operation is preferred in the hydrogenation of a halogenated hydrocarbon as hereinabove set forth, the process may also be effected in batch type operation. Thus in a typical batch type treatment a monohaloalkane or other halogenated hydrocarbon is contacted with hydrogen and an alcohol in the presence of a powdered hydrogenating catalyst contained in an autoclave equipped with mechanical means of agitation and operating under hydrogenating conditions of temperature and pressure. After the hydrogenation reaction proceeds for a time sufficient to convert a substantial proportion of the halogenated hydrocarbon into a reaction mixture containing substantially halogen free hydrocarbon and an alkyl halide, said mixture is separated from the catalyst and fractionally distilled to remove the desired hydrocarbon and alkyl halide from incompletely converted halogenated hydrocarbon, the latter being suitable for recycling to the process.

The following examples are given to illustrate the process of the invention, although with no intention of unduly limiting its generally broad scope.

*Example I*

Chloroheptane (the structure of which was probably 4-chloro-2,2-dimethylpentane) formed by reacting tertiary butyl chloride with propylene in the presence of bismuth chloride catalyst was hydrogenated as hereinafter described. 20 grams of chloroheptane, 32 grams of methyl alcohol, and 8 grams of nickel-diatomaceous earth catalyst, containing approximately 66% by weight of nickel and prepared as hereinabove described, were placed in an autoclave under 100 atmospheres hydrogen pressure and heated for 8 hours at 300° C. The resultant reaction mixture contained 4 grams of heptane.

*Example II*

A fresh sample of the catalyst employed in Example I was utilized in the hydrogenation of a dichlorohexane formed by condensing tertiary butyl chloride with vinyl chloride in the presence of ferric chloride catalyst. In this run 20 grams of the dichlorohexane, 40 grams of methyl alcohol, and 5 grams of nickel-diatomaceous earth catalyst were placed in an autoclave; hydrogen was added to 100 atmospheres pressure; and the charged autoclave was heated at 125° C. for four hours. The reaction product contained 13 grams of methyl chloride and 7 grams of a mixture of neohexane and neohexene. The physical properties of the mixture indicated that at least 60% of the hydrocarbon fraction was paraffinic.

*Example III*

20 grams of chlorocyclohexane, 16 grams of methyl alcohol, and 8 grams of nickel-diatomaceous earth catalyst were placed in the aforementioned autoclave; hydrogen was added to 100 atmospheres pressure; and the charged autoclave was heated for 4 hours at 200° C. The reaction mixture yielded 13 grams of cyclohexane and considerable methyl chloride.

The foregoing specification and examples indicate the character and value of the present process, although it is not intended that either section should unduly limit the generally broad scope of the invention.

We claim as our invention:

1. In a process for dehalogenating a halogenated saturated hydrocarbon wherein the halogenated hydrocarbon is reacted with hydrogen in the presence of a hydrogenating catalyst and a hydrogen halide is liberated which poisons the catalyst, the improved method which comprises reacting said halogenated saturated hydrocarbon with hydrogen in the presence of an alcohol, said alcohol being present in at least an equal molecular proportion with said halogenated saturated hydrocarbon, at a temperature not less than about 125° C. to effect simultaneous reaction of said alcohol with said liberated hydrogen halide to form the corresponding organic halide which is stable under the reaction conditions and non-poisonous to the hydrogenating catalyst.

2. In a process for dehalogenating a halogenated saturated hydrocarbon wherein the halogenated hydrocarbon is reacted with hydrogen in the presence of a hydrogenating catalyst and a hydrogen halide is liberated which poisons the catalyst, the improved method which comprises reacting said halogenated saturated hydrocarbon with hydrogen in the presence of an aliphatic alcohol containing less than four carbon atoms per molecule, said alcohol being present in at least an equal molecular proportion with said halogenated saturated hydrocarbon, at a temperature not less than about 125° C. to effect simultaneous reaction of said alcohol with said liberated hydrogen halide to form an alkyl halide which is stable under the reaction conditions and non-poisonous to the hydrogenating catalyst.

3. In a process for dehalogenating a monohaloalkane wherein the monohaloalkane is reacted with hydrogen in the presence of a hydrogenating catalyst and a hydrogen halide is liberated which poisons the catalyst, the improved method which comprises reacting said monohaloalkane with hydrogen in the presence of an aliphatic alcohol containing less than four carbon atoms per molecule, said alcohol being present in at least an equal molecular proportion with said monohaloalkane, at a temperature in excess of 200° C. to effect simultaneous reaction of said alcohol with said liberated hydrogen halide to form an alkyl halide which is stable under the reaction conditions and non-poisonous to the hydrogenating catalyst.

4. In a process for dehalogenating a polyhaloalkane wherein the polyhaloalkane is reacted with hydrogen in the presence of a hydrogenating catalyst and a hydrogen halide is liberated which poisons the catalyst, the improved method which comprises reacting said polyhaloalkane with hydrogen in the presence of an aliphatic alcohol containing less than four carbon atoms per molecule, said alcohol being present in at least an equal molecular proportion with said polyhaloalkane, at a temperature not less than about 125° C. to effect simultaneous reaction of said alcohol with said liberated hydrogen halide to form an alkyl halide which is stable under the reaction conditions and non-poisonous to the hydrogenating catalyst.

5. In a process for dehalogenating a halocycloparaffin wherein the halocycloparaffin is reacted with hydrogen in the presence of a hydrogenating catalyst and a hydrogen halide is liberated which poisons the catalyst, the improved method which comprises reacting said halocycloparaffin with hydrogen in the presence of an aliphatic alcohol containing less than four carbon atoms per molecule, said alcohol being present in at least an equal molecular proportion with said halocycloparaffin, at a temperature not less than about 125° C. to effect simultaneous reaction of said alcohol with said liberated hydrogen halide to form an alkyl halide which is stable under the reaction conditions and non-poisonous to the hydrogenating catalyst.

6. The process of claim 1 further characterized in that said hydrogenating catalyst comprises nickel.

7. The method defined in claim 2 further characterized in that said aliphatic alcohol comprises methyl alcohol.

8. The method defined in claim 2 further characterized in that said aliphatic alcohol comprises ethyl alcohol.

9. The method defined in claim 2 further characterized in that said aliphatic alcohol comprises a propyl alcohol.

10. The process defined in claim 4 further characterized in that said polyhaloalkane comprises a dihaloalkane.

VLADIMIR N. IPATIEFF.
LOUIS SCHMERLING.

REFERENCES CITED

The following references are of record in the file of this patent:

FOREIGN PATENTS

| Number | Country | Date |
| --- | --- | --- |
| 445,288 | Great Britain | Apr. 6, 1936 |

OTHER REFERENCES

Ellis, Hydrogenation of Organic Substances, pub. by D. Van Nostrand Co., Inc., N. Y. (1930), pages 301–2. Copy in Div. 31.

Borsche et al., Ber., vol. 48, 452–8 (1915), Patent Office Library; also in Chem. Abs., vol. 9, 1773 (1915), Pat. Off. Lib.

Busch et al., Ber., vol. 49, 1063–1069 (1916), Patent Office Library.

Kelber, Ber., vol. 50, 305–310 (1917), Patent Office Library.

Rosenmund et al., Ber., 51, 578–85 (1918), Patent Office Library.